United States Patent [19]
Kobayashi et al.

[11] 3,861,798
[45] Jan. 21, 1975

[54] MASK FOR ALIGNING PATTERNS

[75] Inventors: Kazunari Kobayashi, Hachioji; Hisayuki Higuchi; Michiyoshi Maki, both of Kokubunji, all of Japan

[73] Assignee: Hitachi, Ltd., Tokyo, Japan

[22] Filed: May 21, 1973

[21] Appl. No.: 362,361

[30] Foreign Application Priority Data

May 22, 1972 Japan .............................. 47-19916
May 14, 1973 Japan .............................. 48-53397

[52] U.S. Cl. ..................... 355/61, 355/77, 356/110, 356/172
[51] Int. Cl. ........................................ G03b 27/52
[58] Field of Search ............ 356/172, 110; 355/125, 355/61

[56] References Cited
UNITED STATES PATENTS

| | | | |
|---|---|---|---|
| 3,202,071 | 8/1965 | Carlson | 355/125 |
| 3,519,348 | 7/1970 | McLaughlin | 355/125 X |
| 3,572,942 | 3/1971 | Te Kronnie | 356/172 X |
| 3,604,813 | 9/1971 | Te Kronnie | 356/172 |
| 3,609,033 | 9/1971 | Frantzen | 355/125 X |

*Primary Examiner*—Richard A. Wintercorn
*Attorney, Agent, or Firm*—Craig & Antonelli

[57] ABSTRACT

A semiconductor substrate is provided on its surface with a first pattern for pre-alignment, a first pattern for precise alignment which comprises stripes at fixed intervals, a second pattern for precise alignment which comprises stripes being at fixed intervals and being disposed in a direction orthogonal to the stripes in the first pattern for precise alignment and which is so provided as to orthogonally intersect with the first pattern for precise alignment, and a plurality of reference patterns having predetermined intervals. A photo etching-mask is provided with a second pattern for pre-alignment which is smaller than and similar to the first pattern for pre-alignment, a third pattern for precise alignment which is in a positional relation similar to that between the first pattern for pre-alignment and the first pattern for precise alignment and which comprises stripes being at fixed intervals and differing in direction from the stripes in the first pattern for precise alignment, a fourth pattern for precise alignment which is in a positional relation similar to that between the first pattern for pre-alignment and the second pattern for precise alignment and which comprises stripes being at fixed intervals and being in a direction orthogonal to the stripes in the third pattern for precise alignment, and a pattern to be disposed on the semiconductor substrate. Initially, the first pattern for pre-alignment and the second pattern for pre-alignment are aligned. Subsequently, the semiconductor substrate and/or the photo-mask are moved and adjusted so that the interval between fringes in first Moire fringes formed by the first and third patterns for precise alignment and the interval between fringes in second Moire fringes formed by the second and fourth patterns for precise alignment may both become equal to the intervals of the reference patterns. Thereafter, the semiconductor substrate and/or the photo-mask are moved and adjusted so that each fringe of the first Moire fringes and each fringe of the second Moire fringes may coincide with the corresponding reference patterns. Thus, the pattern of the photo-mask can be aligned with a predetermined position of the semiconductor substrate at high accuracy.

10 Claims, 10 Drawing Figures

MASK FOR ALIGNING PATTERNS

BACKGROUND OF THE INVENTION

The present invention relates to a method of precisely aligning the relative positions of patterns, and to a mask for aligning patterns. More particularly, it relates to a method of precisely aligning patterns for laying minute patterns one over the other and accurately aligning the relative positions thereof as in the alignment of photoetching masks employed in the manufacture of an integrated semiconductor circuit, and to a mask for use in such an alignment of patterns.

When, for example, an integrated semiconductor circuit is produced by a photoetching process, several types of photoetching masks are generally used. The respective photoetching masks are employed for such purposes of defining base and emitter regions constituting transistors, laying conduction paths, and so forth.

In the particular case of forming an emitter region in a specific place within a base region, it is necessary that the relative positions between the semiconductor crystal substrate formed with the base region and the photoetching mask having a pattern for forming the emitter region be accurately aligned, and that the pattern for defining the emitter region be transferred onto a photoresist applied on the semiconductor crystal substrate. Needless to say, the alignment is necessary not only between the masks for the base and emitter, but also among a series of further photoetching masks for forming the integrated circuit.

In order to facilitate such alignment, in general, each photoetching mask is previously formed with a pattern for use in the alignment in addition to the pattern for the formation of the element.

Even with the pattern for the alignment, however, a microscope having a large depth of focus and a long working distance must be employed in order to align the aligning pattern. In other words, a microscope the resolving power of which is not very high must be used. Consequently, it is difficult to make the alignment of the aligning pattern more precise than the resolution of the microscope. A precision of approximately $\pm 1\mu$ is deemed to be the limit of the alignment. In the case of manufacturing a semiconductor device whose minimum working dimension is approximately $1\mu$, the necessity for making the alignment precision of the aligning pattern less than $\pm 0.5\mu$ is created. The development of semiconductor devices with a minimum working dimension of about $1\mu$ have, accordingly, been extremely difficult with the prior-art method of alignment as stated above.

BRIEF DESCRIPTION OF THE INVENTION

It is, therefore, an object of the present invention to provide a method of aligning patterns which eliminates the disadvantage of the prior-art method and which remarkably enhances the precision of the alignment of patterns without using any special means for detecting the alignment.

Another object of the present invention is to provide a mask for aligning patterns with which the positioning of patterns is facilitated.

In order to accomplish the above-mentioned objects, the present invention has been made on the basis of the fact that the interval between fringes in Moire fringes appearing by placing two stripe patterns one over the other depends on the angle at which the stripes of the two stripe patterns intersect.

BRIEF DESCRIPTION OF THE DRAWINGS

The additional objects and advantages of the present invention will become apparent from the following description beginning with a brief explanation of a prior-art method of aligning patterns, when taken in connection with the accompanying drawings, wherein.

The outline of aligning patterns having hitherto been performed will be described hereunder with reference to FIGS. 1A, 1B and 2.

Figure 1A:
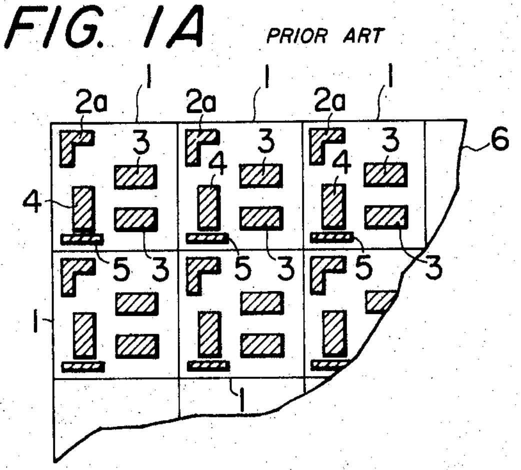
FIG. 1A PRIOR ART
FIGS. 1A and 1B are fragmentary plan views of prior-art photoetching masks each having a pattern for alignment.
Figure 1B:
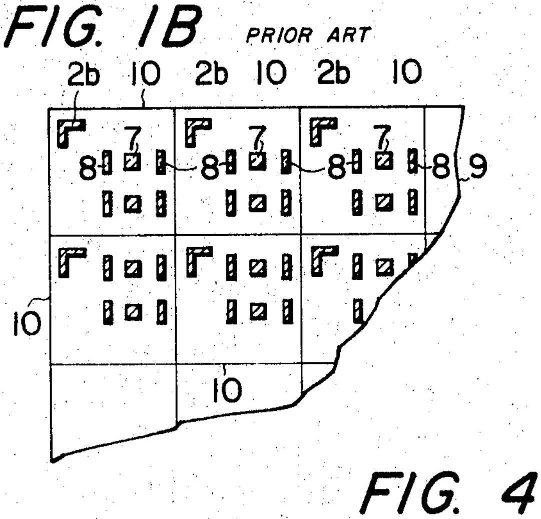
FIG. 1B PRIOR ART

FIGS. 1A and 1B show, in model-like manner, photoetching masks for manufacturing an integrated circuit. FIG. 1A is a plan which shows a pattern portion of the photoetching mask for defining base regions of transistors and regions of circuit resistance elements. A group of patterns 6 includes pattern areas 1 each serving to construct a unit circuit. The unit circuit pattern area 1 contains an aligning pattern 2*a*, a pattern 3 for defining the base region, and patterns 4 and 5 for forming the circuit resistance element.

FIG. 1B illustrates the photoetching mask for defining emitter regions and collector electrode regions. A group of patterns 9 includes pattern areas 10 for constructing unit circuits. Each pattern area 10 carries an aligning pattern 2*b*, a pattern 7 for defining the emitter region, and a pattern 8 for forming the collector electrode.

When the pattern of FIG. 1B is to be formed on a semiconductor crystal substrate already formed with the pattern of FIG. 1A, the relative positions between both the patterns must be precisely aligned.

To this end, the aligning patterns 2*a* and 2*b* are made the standards for the alignment of the relative positions between both the patterns.

Figure 2:
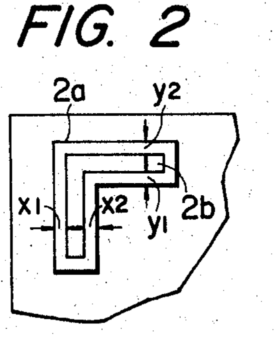
FIG. 2 is a fragmentary plan view of the aligning pattern portions of FIGS. 1A and 1B, showing the state in which they are superposed on each other.

FIG. 2 is a plan view showing the parts of the aligning patterns 2*a* and 2*b* in FIGS. 1A and 1B on an enlarged scale. In the illustrated state, they are superposed on each other.

The alignment between the aligning patterns 2*a* and 2*b* is effected by bringing the distances $x_1$, $x_2$, $y_1$ and $y_2$ between them within established limits. As previously stated, the alignment is carried out while viewing the patterns through a microscope. With respect to the adjustment with the human eye, in order to achieve the highest possible degree of accuracy, it is easier to adjust the distances between the aligning patterns $x_1$ and $x_2$ and those $y_1$ and $y_2$, so that they respectively become equal than to have them respectively satisfy certain ratios (except 1 : 1). Accordingly, the alignment is usually performed in such a way that the semiconductor substrate and/or the photoetching masks are mutually moved so as to establish $x_1 = x_2$ and $y_1 = y_2$.

In the contact printing process often employed for the transfer of a pattern in the prior art, the semiconductor substrate and the photoetching mask must be kept apart by approximately 5 – 25μ during alignment in order to facilitate the movement of the photoetching mask during alignment and to protect the semiconductor substrate, as well as the mask, from flaws. Furthermore, it is necessary to observe the pattern on the semiconductor substrate through the photoetching mask. Consequently, the microscope to be used during alignment of the patterns requires, among its characteristics, that it have a depth of focus at least equivalent to the distance between the semiconductor substrate and the photoetching mask (5 – 25μ) and that it have a comparatively long distance from the focus (the surface of the semiconductor substrate) to the objective lens (about 3 mm or more) for convenience sake for providing a support for the photoetching mask and for conducting a variety of operations. As is well known in the field of optics, a larger depth of focus leads to a poorer resolving power. Therefore, the resolving power which is very important for and indispensable to an accurate alignment of patterns must be sacrificed to some extent in the microscope which must possess characteristics as mentioned above.

At present, a microscope preferable for the alignment has an overall magnifying power of 300, a working distance of 15 mm and a depth of focus of 7μ. The resolving power of the microscope is 0.8μ. Even when the alignment is carried out by utilizing the aligning patterns, it is difficult to make the alignment accuracy higher than the resolution of the microscope. Accordingly, insofar as the microscope as described above is employed, an accuracy of about ±1μ is regarded as the limit of the alignment.

In a semiconductor device of a high-frequency element having a cut-off frequency of 20 – 30 GHz, such as an FET (field-effect transistor) of GaAs and a super-high-frequency IC (integrated circuit), the minimum working dimension is approximately 1μ. It is, accordingly, necessary to make the alignment precision less than ±0.5μ. With the foregoing prior art method of alignment, therefore, the manufacture of such high-frequency semiconductor element is difficult.

DETAILED DESCRIPTION OF THE INVENTION

The present invention consists in that, at the mutually corresponding parts of two patterns to be aligned, the two patterns are respectively provided with stripe patterns, so as to define predetermined angles, and that the precise alignment of the patterns is effected by utilizing Moire fringes which are generated when the two patterns are placed one over the other.

The present invention will be described hereunder in conjunction with its embodiments of mask registration in the manufacture of integrated semiconductor circuits which is the most effective field of application of the present invention.

Figure 3A:
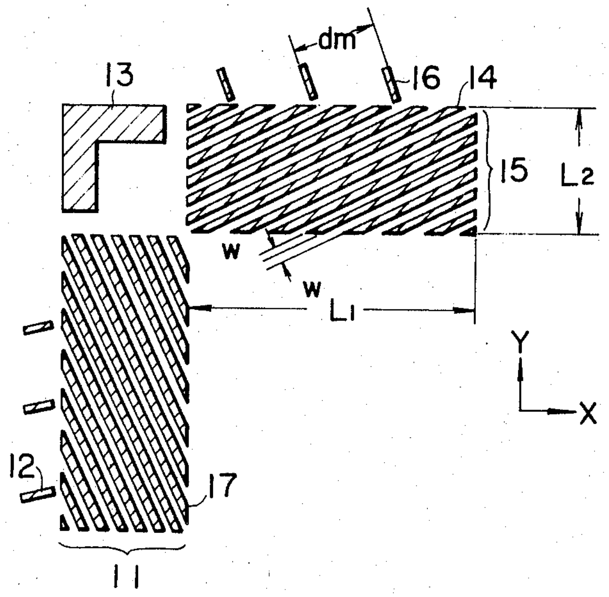
FIGS. 3A and 3B are plan views of aligning patterns according to an embodiment of the present invention.
Figure 3B:
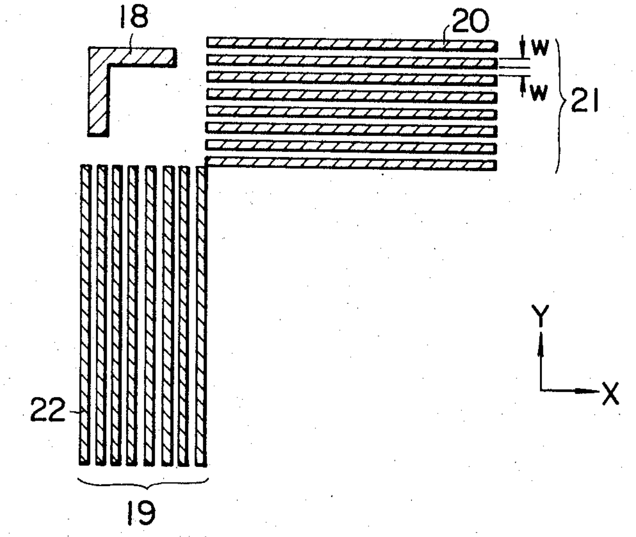

FIGS. 3A and 3B are plans which show the aligning pattern portions of photoetching masks for use at the production of a semiconductor device in an embodiment of the present invention. For the sake of convenience of the description, the patterns of circuit portions are omitted.

The aligning pattern portion of the photoetching mask illustrated in FIG. 3A is composed of a pattern for pre-alignment 13, first and second patterns for precise alignment 11 and 15, and reference lines 12 and 16. The first pattern for precise alignment 11 consists of a plurality of stripe patterns 17 which are parallel to one another. The second pattern for precise alignment 15 consists of a plurality of stripe patterns 14 which are parallel to one another and which are in a direction orthogonal to that of the stripe patterns 17 constituting the first precisely-aligning pattern 11.

The aligning pattern portion of the photoetching mask shown in FIG. 3B is composed of a pattern for pre-alignment 18, and third and fourth patterns for precise alignment 19 and 21. The third pattern for precise alignment 19 consists of a plurality of stripe patterns 22 which are parallel to one another. The fourth pattern for precise alignment 21 consists of a plurality of stripe patterns 20 which are parallel to one another and which are in a direction orthogonally intersecting with that of the stripe patterns 22 constituting the third pattern for precise alignment 19.

The patterns for pre-alignment 13 and 18 have the associations of dimensions as in the prior-art aligning patterns 2*a* and 2*b* illustrated in FIG. 2. The first and second patterns for precise alignment 11 and 15 are disposed at such positions that, when the patterns for pre-alignment 13 and 18 are perfectly aligned, the patterns 11 and 15 are respectively and at least partially superposed in dimensions on the third and fourth patterns for precise alignment 19 and 21 except the directions of the stripe patterns.

The interval of the reference lines 12 is equal to the interval between fringes in Moire fringes created by the interference of light between the first precisely-aligning pattern 11 and the third precisely-aligning pattern 19. On the other hand, the interval between the reference lines 16 is equal to the interval between the fringes in Moire fringes produced by the interference of light between the second precisely-aligning pattern 15 and the fourth precisely-aligning pattern 21. The reference lines 12 and 16 are disposed at positions being very close to the first precisely-aligning pattern 11 and the second precisely-aligning pattern 15, respectively.

Each of the patterns for precise alignment is made of an oxide film on a semiconductor substrate, in which thick parts and thin parts as obtained by etching are periodically arrayed, or such oxide film which has slopes on the sides of the thick parts thereof. Alternatively, it may be made of such an oxide film in which the surface of the semiconductor substrate is periodically exposed, the exposed parts being obtained over a long period of etching. Further, it may be made of periodical stripes of an aluminum film and an oxide film as are obtained by evaporating aluminum and then selectively etching it. In other words, the patterns for precise alignment are composed of a pair of stripes having an optical path difference or periodically differing in their degree of light transmission.

In order to facilitate a better understanding of the present invention, detailed description will be made of Moire fringes which are produced by the pair of the patterns for precise alignment 15 and 21.

Figure 4:
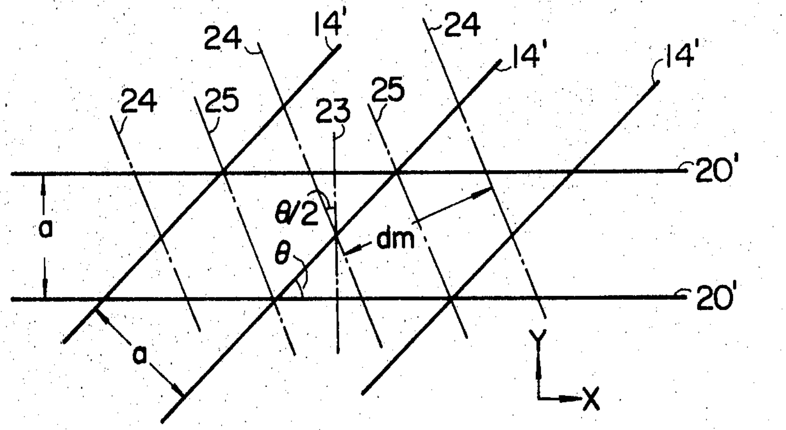
FIG. 4 is a diagram for explaining the principle of the aligning patterns of the present invention.

FIG. 4 illustrates a state in which the stripe patterns 14 and 20 are aligned. In order to simplify the explanation, the stripe patterns 14 and 20 are denoted by the respective center lines 14' and 20'.

Let the width of each stripe of the precisely-aligning patterns be W, the spacing between the stripes be W, the distance between the center lines be $a$ (=2W), and the angle defined by the stripe patterns 14 and 20 be $\theta$.

A chain line 23 is let to be a reference line which intersects at right angles with the center lines 20'. Moire fringes created by the straight lines 14 and 20 becomes such that the center of a dark part thereof is positioned at a chain line 24, while the center of a bright part thereof at a chain line 25. At this time, the Moire fringes are bright and dark fringes parallel to a direction of an angle $\theta/2$ with respect to the chain line 23.

Letting the interval of the Moire fringes be $d_m$, $$d_m = a/2 \cdot \operatorname{cosec} \theta/2$$

Here, assuming that $\theta$ is small, $$\tfrac{1}{2} \cdot \operatorname{cosec} \theta/2 = \operatorname{cosec} \theta$$

Therefore, $$d_m = a \cdot \operatorname{cosec} \theta = a\,M = 2\,W\,M$$

Thus, the fringe interval of the Moire fringes is expanded to 2 M times as large as the width of the stripe of M times of the interval of the stripes.

Even if it is now assumed that M = 10 and that the observational precision for the Moire fringes is ±3μm, the relative positions between the straight lines 14 and 20 are equivalently observed at an accuracy of ±0.3μm. One skilled in the art will therefore fully understand that an alignment more precise than the resolving power of an optical microscope is possible by the use of the aligning patterns for generating the Moire fringes.

The Moire fringes formed by the first precisely-aligning pattern 11 and the third precisely-aligning pattern 19 are moved in the Y-direction when the latter pattern 19 is moved in the X-direction. On the other hand, the Moire fringes formed by the second precisely-aligning pattern 15 and the fourth precisely-aligning pattern 21 are moved in the X-direction when the latter pattern 21 is moved in the Y-direction.

Description will now be made of the method of the present invention for aligning photoetching masks employing precisely-aligning patterns, reference being had to FIGS. 3A and 3B.

First, the pre-aligning patterns 13 and 18 are aligned at a dimensional accuracy preciser than the distance $a$ (=2 W) between the center lines of the respectively adjacent stripes. Subsequently, the fringe interval of the Moire fringes produced by the first and third precisely-aligning patterns 11 and 19 is made so as to be equal to the interval of the reference lines 12, while the fringe interval of the Moire fringes generated by the second and fourth precisely-aligning patterns 15 and 21 is made so as to be equal to the interval of the reference lines 16. Thereafter, the photoetching masks are moved and aligned so that the bright parts (or dark parts) of the Moire fringes brought forth by the first and third precisely-aligning patterns 11 and 19 may coincide with the reference lines 12, and that the bright parts (or dark parts) of the Moire fringes brought forth by the second and fourth precisely-aligning patterns 15 and 21 may coincide with the reference lines 16.

Making the fringe intervals of the Moire fringes equal to the intervals of the reference lines is to correct a shift in the rotational (or angular) direction between the photoetching mask and the semiconductor substrate. To make the bright (or dark) fringe parts of the Moire fringes coincident with the reference lines, is for correcting shifts in the X- and Y-directions between the photoetching mask and the semiconductor substrate.

Figure 5:
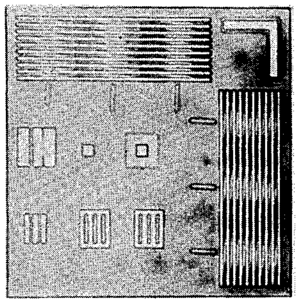
FIG. 5 is a photographic diagram of the aligning patterns in FIGS. 3A and 3B are superposed.

A photographic diagram after alignment is shown in FIG. 5.

It will be seen from the figure that the fringe intervals of the Moire fringes are equal to the intervals of the reference lines, and that the bright parts of the Moire fringes are coincident with the reference lines.

In the case of producing an integrated semiconductor circuit device, there are required a number of steps of formation of buried layers, isolation, formation of base regions, formation of emitter regions, formation of electrode portions, wirings, and so forth. At every such step, an alignment between the photoetching mask and the semiconductor substrate is carried out. However, high precision is not required for each alignment, but an alignment using only the patterns for pre-alignment is sometimes satisfactory. Needless to say, it is not necessary to employ the present invention in such cases. A high precision of alignment within 0.5μ is required once, or only a few times in, for example, alignment for providing contact holes for emitter and base electrodes, alignment at laying the electrodes on the emitter and base, or alignment for laying gate metal for MOS transistors or the like.

Concrete dimensions in FIGS. 3A and 3B are set forth below. The width of each stripe of the patterns for precise alignment and the interval of the stripes (both being represented by W) are respectively 3μ. The length $L_1$ of the patterns for precise alignment is 240μ, while the width $L_2$ is 51μ. The interval of the reference lines is 60μ. At this time, M (previously specified) becomes 10. Accordingly, even when the unit circuit region contains the aligning patterns therein, its area is not significantly increased. In the case of manufacturing actual integrated semiconductor circuits, cutting zones for separating the unit circuits are usually formed. Since the width of the cutting zone is approximately 100μ, the aligning pattern may be formed in this region without any inconvenience.

There will now be described a concrete example in which the present invention was applied to a case of forming GaAs field-effect transistors of the Schottky barrier type by the photoetching process.

In an alignment for the case of laying gate metal between the source and drain of each transistor in which the spacing between the source and drain was 3μ and the gate width was 1μ, the stripe width and interval W for generating Moire fringes was selected at 3μ and $d_m$ at 60μ (M = 10, $\theta$ = 5° 44') as shown in FIGS. 3A and 3B. A microscope of 180 power was used. A printing treatment was carried out with conventional printing equipment of the contact exposure type. The alignment precision at this time was ±0.3μ.

Since the arrangement error (pitch error) of the unit circuit regions of the photoetching masks employed is ±0.25μ, the alignment precision is extremely high.

The photoetching masks used in the example are among the high-precision types presently available. If the precision of the photoetching masks is increased, the alignment accuracy can be more enhanced.

As described above in connection with the example, the accuracy can be sufficiently enhanced by the use of means similar to those in the prior art as the pattern aligning devices.

In the foregoing embodiment, the widths of the stripes of all the patterns for precise alignment 11, 15, 19 and 21 are identical, and the widths of the spaces between the stripes are identical. The present invention, however, need not construct the precisely-aligning patterns of only the stripes having such widths.

Figure 6:
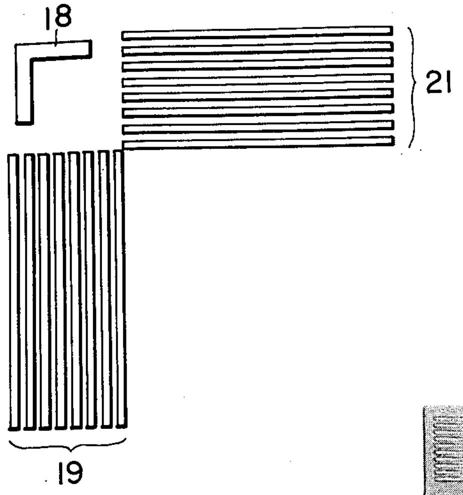
FIG. 6 is a plan view of an aligning pattern according to another embodiment of the present invention.

There can be employed precisely-aligning patterns in which the interval *a* between the center lines of the stripes of the respective precisely-aligning patterns is fixed, and in which the width of the stripes of the first precisely-aligning pattern 11 and that of the stripes of the third precisely-aligning pattern 19, and the width of the stripes of the second precisely-aligning pattern 15 and that of the stripes of the fourth precisely-aligning pattern 21 differ from each other, respectively. For example, it is possible that as the first and second precisely-aligning patterns, those as shown in FIG. 3A are used, while as the third and fourth precisely-aligning patterns, patterns as shown in FIG. 6 are used in which the widths of stripes are larger than those of the stripes of the precisely-aligning patterns illustrated in FIG. 3A. In this case, the width of each bright part of Moire fringes formed by the precisely-aligning patterns in FIG. 3A and the precisely-aligning patterns in FIG. 6 is narrower than the width of each bright part of the Moire fringes formed by the precisely-aligning patterns in FIG. 3A and the precisely-aligning patterns in FIG. 3B. Thus, when the photoetching mask is aligned by the use of the bright parts of the Moire fringes as have become narrower, the alignment accuracy becomes higher than that attained by the alignment using the wider bright parts of the Moire fringes.

On the other hand, when precisely-aligning patterns having stripes narrower than those of the precisely-aligning patterns shown in FIG. 3A are employed instead of the precisely-aligning patterns shown in FIG. 3B, the width of each bright part of Moire fringes formed by these precisely-aligning patterns is larger than the width of each bright part of the Moire fringes formed by the precisely-aligning patterns illustrated in FIGS. 3A and 3B. In contrast, the width of each dark part is smaller. Accordingly, when the photoetching mask is aligned by the use of the dark parts of the Moire fringes as have become narrower, the alignment precision becomes higher than that acquired by an alignment using the wider dark parts of the Moire fringes.

When the interval *a* between the stripes of the respective precisely-aligning patterns is fixed and the width of the stripes of the respective precisely-aligning patterns is larger, each bright part can be made narrower. When the width of the stripes is made smaller under the specified condition of *a*, each dark part can be made narrower. Thus, the alignment precision can be enhanced as in the above description.

Although, in the foregoing embodiments, the widths between the stripes of the respective precisely-aligning patterns are identical, there can also be used precisely-aligning patterns whose widths between stripes differ from each other. More specifically, the widths between the stripes of the first and third precisely-aligning patterns may be made different from each other. The widths between the stripes of the second and fourth precisely-aligning patterns may also be made different from each other. In the case of making the width between the stripes larger, however, the contrast of the Moire fringes decreases.

Further, although, in the foregoing embodiments, the direction of the stripes of the first precisely-aligning pattern and that of the stripes of the second precisely-aligning pattern intersect orthogonally with each other, the direction of the stripes is not restrictive in the present invention. This applies also to the third and fourth patterns for precise alignment.

The direction of the stripes of the first precisely-aligning pattern and that of the stripes of the third precisely-aligning pattern, and the direction of the stripes of the second precisely-aligning pattern and that of the stripes of the fourth precisely-aligning pattern are required only not to be identical, respectively. As the difference in the directions of the stripes becomes smaller, the fringe interval of Moire fringes becomes wider. Therefore, a small difference in the directions is desirable for enhancement of the alignment accuracy.

Figures 7A, 7B:
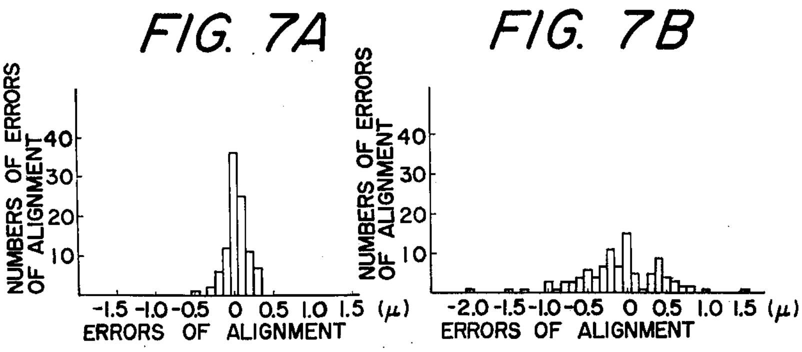
FIGS. 7A and 7B are graphs showing the distributions of alignment errors of photo-masks as caused by the method of the present invention and that of the prior art, respectively.

FIGS. 7A and 7B illustrate the distribution of errors in the case where photoetching masks were aligned by the aligning method of the present invention, and the distribution of errors in the case where photoetching masks were aligned by the aligning method of the prior art, respectively.

In each graph, the abscissa represents the errors of the alignment, while the ordinate designates the number of the errors of the alignment.

As is apparent from the graphs, the precision in the aligning method of the present invention is far more excellent than that in the method of the prior art.

The foregoing embodiments have mainly referred to the case of applying the invention to the manufacture of integrated semiconductor circuits. It is obvious, however, that the invention is not restricted to the embodiments, but that it is applicable to cases of precisely and easily aligning the relative positions of minute patterns placed one over the other.

What we claim is:

1. A mask for aligning patterns, comprising:

a first group of patterns disposed on a first base member, said first group consisting of a first pattern for pre-alignment, a first pattern for precise alignment which comprises a plurality of first stripes disposed at equal intervals and parallel to one another, and a second pattern for precise alignment which comprises a plurality of second stripes disposed at equal intervals and parallel to one another, the direction of said second stripes differing from that of said first stripes of said first pattern for precise alignment;

a second group of patterns disposed on a second base member, said second group consisting of a second pattern for pre-alignment, a third pattern for precise alignment which is provided at such a position as to be superposed on said first pattern for precise alignment when said first and second patterns for pre-alignment are superposed on each other and which comprises third stripes disposed at equal intervals and parallel to one another, the direction of said third stripes differing from that of first stripes of said first pattern for precise alignment, and a fourth pattern for precise alignment which is provided at such a position as to be superposed on said second pattern for precise alignment when said first and second patterns for pre-alignment are superposed on each other and which comprises fourth stripes disposed at equal intervals and parallel to one another, the direction of said fourth stripes differing from that of said second stripes of said second pattern for precise alignment;

a first reference pattern disposed in the vicinity of one of said first and third patterns for precise alignment, and a second reference pattern disposed in the vicinity of one of said second and fourth patterns for precise alignment;

whereby upon alignment with each other, said first pattern for pre-alignment and said second pattern for pre-alignment produce first Moire fringes, and said first pattern for precise alignment and said third pattern for precise alignment, and said second pattern for precise alignment and said fourth pattern for precise alignment, respectively, produce second Moire fringes, the spacing of said first Moire fringes being adjustable to coincide with said first reference pattern and the spacing of said second Moire fringes being adjustable to coincide with said second reference pattern.

2. A mask for aligning patterns as defined in claim 1, wherein the direction of said first stripes of said first pattern for precise alignment is orthogonal to the direction of said second stripes of said second pattern for precise alignment, while the direction of said third stripes of said third pattern for precise alignment is orthogonal to the direction of said fourth stripes of said fourth pattern for precise alignment.

3. A mask for aligning patterns as defined in claim 1, wherein the interval between said first stripes of said first pattern for precise alignment is equal to the interval between said second stripes of said second pattern for precise alignment, while the interval between said third stripes of said third pattern for precise alignment is equal to the interval between said fourth stripes of said fourth pattern for precise alignment.

4. A mask for aligning patterns as defined in claim 3, wherein the interval between said first stripes of said first pattern for precise alignment is equal to the interval between said third stripes of said third pattern for precise alignment.

5. A mask for aligning patterns as defined in claim 1, wherein the size of said first pattern for pre-alignment differs from the size of said second pattern for pre-alignment.

6. A mask for aligning patterns as defined in claim 5, wherein the size of said first pattern for pre-alignment is larger than that of said second pattern for pre-alignment.

7. A mask for aligning patterns as defined in claim 1, wherein the width of said first stripes of said first pattern for precise alignment is smaller than that of said third stripes of said third pattern for precise alignment.

8. A mask for aligning patterns as defined in claim 1, wherein the width of said second stripes of said second pattern for precise alignment is smaller than that of said fourth stripes of said fourth pattern for precise alignment.

9. A mask for aligning patterns as defined in claim 1, wherein the widths of said first and second stripes of said first and second patterns for precise alignment are smaller than those of said third and fourth stripes of said third and fourth patterns for precise alignment.

10. A mask for aligning patterns as defined in claim 1, wherein each of said first and second reference patterns is disposed in a direction forming an angle of $\theta/2$ with respect to the directions of said fourth and third stripes, respectively, wherein $\theta$ is the angle at which the directions of said first and third and said second fourth stripes intersect each other.

* * * * *